United States Patent [19]

Pajonas et al.

[11] 4,442,783
[45] Apr. 17, 1984

[54] TEMPERING AIR HEATING ON PULVERIZING HIGH MOISTURE FUELS

[75] Inventors: Thomas L. Pajonas, Bristol; Gerald F. Barcikowski, West Simsbury; Andrew J. Ennaco, Simsbury, all of Conn.

[73] Assignee: Combustion Engineering, Inc., Windsor, Conn.

[21] Appl. No.: 410,178

[22] Filed: Aug. 20, 1982

[51] Int. Cl.³ .............................................. F23K 1/04
[52] U.S. Cl. .................................. 110/347; 110/232; 110/106
[58] Field of Search ..... 110/101 R, 101 CF, 101 CA, 110/106 R, 224, 232, 254, 263, 304, 309, 342, 347; 122/1 A

[56] References Cited

U.S. PATENT DOCUMENTS 3,273,520  9/1966  Hottenstine ..................... 110/347 X
4,090,455  5/1978  McCartney ........................ 110/232

*Primary Examiner*—Henry C. Yuen
*Attorney, Agent, or Firm*—William W. Habelt

[57] ABSTRACT

In a pulverized fuel-fired furnace (10), the temperature of the mixture of pulverized fuel and primary air leaving the mill (36) is measured and compared to a preselected minimum acceptable temperature. Whenever the measured mixture temperature drops below a preselected minimum, the flow damper (78) disposed in the tempering air duct (44) is closed to minimize the flow of tempering air therethrough and a heating fluid (62) is passed in heat exchange relationship with any ambient temperature air leaking past the flow damper in the tempering air duct thereby preheating the tempering airflow. Preferably, hot water (62) is circulated from the waterwall inlet header (22) of the water-cooled water walls (12) of the furnace (10) through a heat exchanger (60) disposed in the tempering air duct (44) and then returned back to the water-cooling circuit (24) of the water-cooled furnace walls at a location upstream of the circulating pump (26).

1 Claim, 2 Drawing Figures

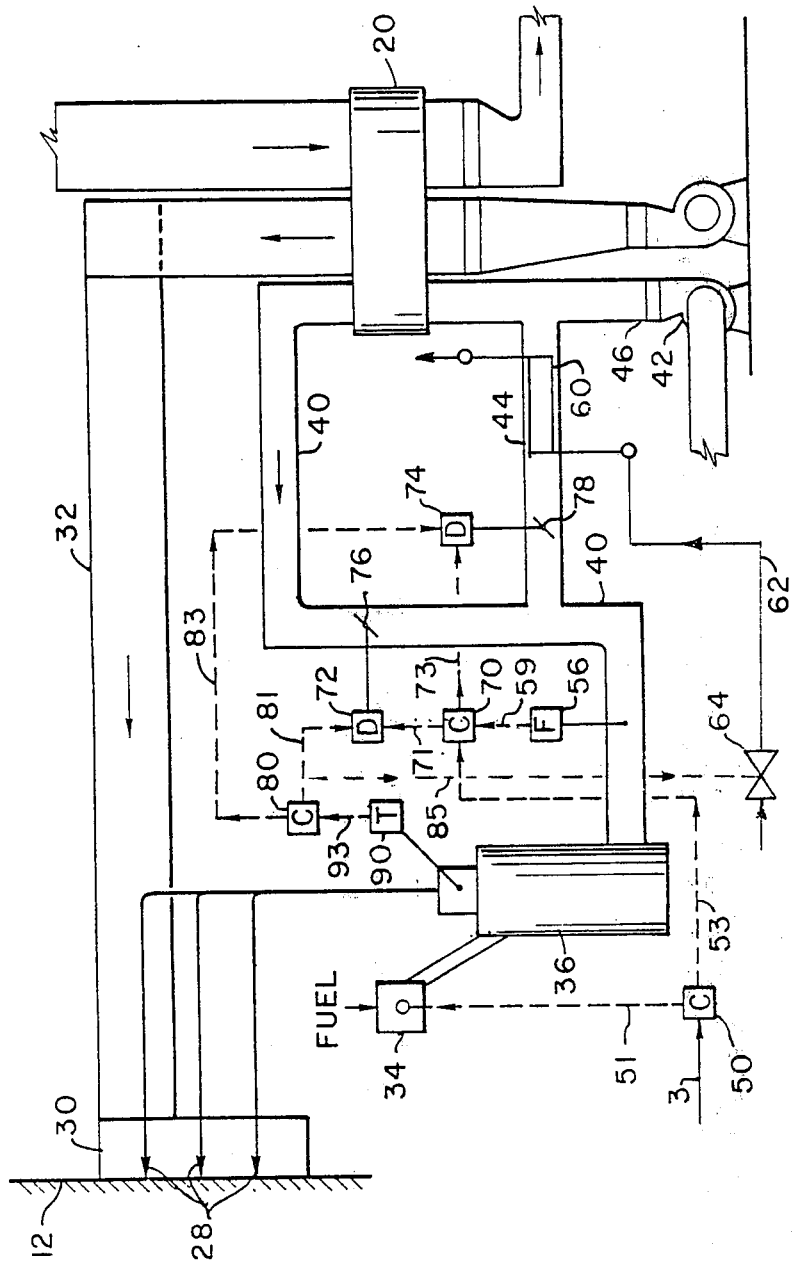

TEMPERING AIR HEATING ON PULVERIZING HIGH MOISTURE FUELS

BACKGROUND OF THE INVENTION

The present invention relates generally to the operation of pulverized fuel-fired combustion systems and, more particularly, to the pulverizing of high moisture solid fuels such as sub-bituminous coal, lignite and peat.

In suspension firing solid fuel, such as coal, lignite and peat, the fuel must be first pulverized and dried before it can be introduced into the furnace in a stream of air commonly termed primary air. This is accomplished in a mill wherein the solid fuel is simultaneously pulverized and dried in the primary air. In order to obtain sufficient heat for adequate drying of the fuel, the primary air must be preheated from ambient temperature to a higher temperature sufficient to provide adequate heat for drying of the pulverized fuel. At the same time, however, the heat content of the preheated primary air, i.e., the temperature of the primary air, must be kept below and not allowed to exceed that point at which excessive release of volatiles from the fuel would occur within the pulverizer as such an excessive release of volatiles could result in an explosion within the pulverizer.

Therefore, it is common in the prior art to bypass a portion of the primary air which is being supplied to the air preheater at ambient temperature around the air preheater and to remix this ambient tempering air with the preheated primary air from the air heater at a point upstream of the mill. The quantity and temperature requirements of the primary air stream to the mill are met by adjusting dampers disposed in the ambient tempering air and preheated primary air supply ducts prior to remixing of the ambient and preheated primary air streams.

Typically, the temperature of the mixture of pulverized fuel and primary air leaving the mill is measured and compared to a desired value. Simultaneously, the quantity of primary air entering the mill is sensed and compared to a preselected minimum level representative of the quantity of primary air necessary to insure an adequate transport velocity within the piping from the pulverizer outlet to the furnace so that the pulverized coal will not precipitate out of the air stream during transport. Each of the air dampers in the tempering primary air and the preheated primary air ducts are then operated in response to both airflow and temperature measurements to provide a sufficient quantity of primary air at a sufficient temperature.

Therefore, proper pulverizer operation requires that airflow be kept above a minimum commensurate with adequate transport velocity within the pulverized fuel piping while maintaining a temperature which is sufficiently high to dry the coal but not so high as to present a fire or explosion hazard within the mill. However, a problem has arisen when pulverizing very high-moisture fuels such as high-moisture bituminous coals, lignite and peat, in that adequate drying of the pulverized fuel cannot be obtained at the required primary airflow because the temperature of the primary air to the mill cannot be maintained at sufficiently high levels even with the ambient temperature tempering air duct dampers closed due to leakage of ambient temperature air around the dampers. Such leakage typically amounts to 10% of the total primary airflow to the mills. This problem is particularly troublesome in the winter in the temperate climates as the ambient temperature can typically be as low as −15 C. and even lower in some situations. When this very cold ambient air leaks through the tempering air duct and remixes with the preheated primary air, the temperature of the primary air entering the mill can be lowered by as much as 30 to 50 C. thereby resulting in inadequate drying of the high moisture fuel.

Therefore, it is the general object of the present invention to provide an improved method and apparatus for insuring that a sufficiently high primary air temperature can be maintained at the required primary air quantity to assure the adequate drying of very high moisture fuels.

It is a specific object of the present invention to provide a method and apparatus for heating any ambient temperature air leaking through the tempering air duct prior to remixing the tempering air with the preheated primary air thereby negating the effect of mixing cold ambient air with the preheated primary air leaving the air heater.

SUMMARY OF THE INVENTION

The present invention overcomes the above discussed and other deficiencies and disadvantages of the prior art and accomplishes the above-mentioned and other objects by providing an improved method and apparatus for controlling the temperature of the primary air delivered to a mill.

According to the present invention, the temperature of the mixture of pulverized fuel and primary air leaving the mill is measured and compared to a preselcted minimum acceptable temperature. Whenever the measured mixture temperature drops below a preselected minimum, the flow damper disposed in the tempering air duct is closed to minimize the flow of tempering air therethrough and a heating fluid is passed in heat exchange relationship with any ambient temperature air leaking past the flow damper in the tempering air duct thereby preheating the tempering airflow. Preferably, hot water is circulated from the cooling circuit of the water-cooled water walls of the furnace through a heat exchanger disposed in the tempering air duct and thence returned back to the water-cooling circuit of the water-cooled furnace walls.

BRIEF DESCRIPTION OF THE DRAWING

FIG. 2 is an enlarged side elevational view showing the means for controlling primary air temperature in accordance with the present invention.

DESCRIPTION OF THE PREFERRED EMBODIMENT

Figure 1:
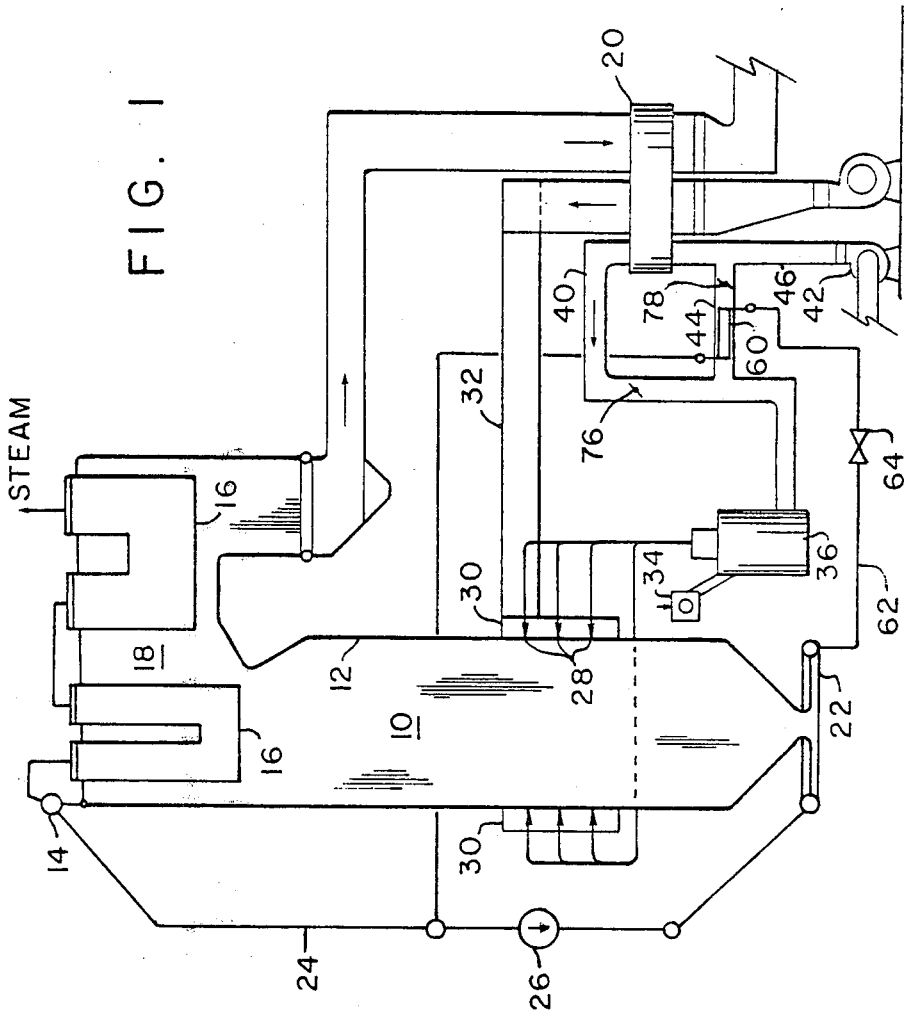
FIG. 1 is a sectional side elevational view showing a pulverized fuel-fired steam generator operated in accordance with the present invention.

Referring now to the drawing, and particularly to FIG. 1, there is depicted therein a pulverized fuel-fired steam generator having a furnace 10 formed of waterwall 12 defining a chamber therein wherein pulverized fuel is burned thereby generating hot flue gases. Water from the lower waterwall ring header 22 is passed upwardly through the waterwalls 12 wherein it absorbs heat from the combustion of the fuel within the furnace 10. The water is first heated to saturation temperature and then partially evaporated to form a steam-water mixture. The steam-water mixture leaving the waterwall 12 is collected in an outlet header and passed to drum 14 wherein the steam and water are separated. The water separated from the steam-water mixture in drum 14 is mixed with make-up water and passed through downcomer 24 to circulating pump 26 wherein it is repressurized and again passed to the lower waterwall inlet ring header 22 for recirculation through the waterwalls 12. The steam removed from the steam-water mixture in the drum 14 is passed through heat exchange surface 16, typically superheat and reheat surface, disposed in the gas exit duct 18 which interconnects the furnace 10 with the steam generator stack (not shown) for providing a flow passage for venting the gases formed in the furnace to the atmosphere. In passing through the heat exchange surface 16, the steam is heated as it passes in heat exchange relationship with the hot flue gases generated in the furnace 10 before leaving the furnace 10 through the exit duct 18.

As the hot flue gases leaving the furnace 10 through the gas exit duct 18 traverse the steam heating surface 16 disposed therein the hot flue gases cooled by transferring heat to the steam flowing through the steam heating surface to 16 to a temperature typically in the range of 320 to 370 C. The flue gas is then further cooled to a temperature in the range of 120 to 150 C. prior to venting to the atmosphere by passing the flue gas in heat exchange relationship with combustion air being supplied to the furnace 10 through air preheater 20 disposed downstream of the furnace 10 in the gas exit duct 18.

The furnace 10 is fired by injecting pulverized fuel into the furnace thru burners 28 disposed in windboxes 30. Combustion air, typically termed secondary air, which has been preheated by passing in heat exchange relationship in air preheater 20 with the flue gases leaving the furnace 10 through duct 18, is supplied through duct 32 to the windbox 30 for introduction into the furnace 10. In accordance with conventional practice, the amount of fuel injected into the furnace is controlled in response to load demand on the steam generator to provide the total heat release necessary to yield a desired stream generation for the given steam generator design.

In pulverized fuel firing, as shown in the drawing, solid fuel, such as coal, lignite or peat, is fed from a storage bin, not shown, at a controlled rate through feeder 34 to the mill 36 wherein the fuel is pulverized to a fine powder-like particle size. In a typical pulverized fuel-fired furnace, air, termed primary air, is supplied to the mill 36 for transporting the pulverized fuel from the mill 36 to the burners 28 to be injected into the furnace 10 and burned as a suspension therein. As mentioned previously, the primary air supplied to the mill 36 is first preheated in the air heater 20 wherein the primary air is passed in heat exchange relationship with the flue gases leaving the furnace through exit duct 18. As the preheated air sweeps through the mill 36, the comminuted coal is entrained therein and dried by the heat content of the preheated air.

The control of the quantity and temperature of the primary air supplied to the mill may be obtained through a series of dampers and controllers as best illustrated in FIG. 2. A master signal 3 indicative of steam generator load is sent to fuel feed controller 50. In response thereto the fuel feed controller 50 generates and transmits a signal 51 to feeder 34 which in response thereto regulates the rate of fuel feed to the mill 36. Additionally, the controller 50 generates and transmits a second signal 53 also indicative of the fuel feed rate to primary air volume flow rate controller 70.

Controller 70 also receives a signal 59 indicative of the volume flow rate of primary air to the mill 36 from volume flow monitor 56 disposed in the primary air duct 40 near the inlet to the mill 36 to monitor the volume flow rate of primary air therethrough. In response to signal 53 indicative of fuel feed rate and signal 59 indicative of primary air volume flow rate, the controller 70 sends a control signal 71 to damper drive 72 and a control signal 73 to damper drive 74 to selectively open or close dampers 76 and 78 respectively. Controller 70 is programmed to maintain the volume flow rate of primary air to the mill at a preselected value dependent upon the instantaneous fuel feed rate. On a weight basis, the ratio of the flow of primary air to fuel should be maintained at a value greater than about 1.5 in order to insure that there is sufficient volume of primary air to provide an adequate velocity to transport the pulverized fuel from the mill 36 to the furnace.

In order to insure proper drying of the pulverized fuel in the mill 36, the primary air supplied to the mill must be at a sufficient temperature to provide enough heat to evaporate moisture contained in the fuel pulverized in the mill 36. Additionally, the temperature of the pulverized fuel and primary air mixture leaving the mill must be high enough to insure that the moisture evaporated from the fuel does not condense as the fuel is being conveyed to the furnace. Therefore, a temperature monitor 90 is disposed at the outlet of the mill 36 to monitor the temperature of the primary air and pulverized fuel mixture being conveyed from the mill 36 to the burners 28 of the furnace.

The temperature monitor 90 generates and transmits a signal 93 indicative of the mill temperature to the primary air temperature controller 80. In response thereto, the controller 80 generates and transmits a control signal 81 to damper drive 72 and a control signal 83 to damper drive 74. Damper drive 72 actuates damper 76 disposed in the primary air duct 40 at a location just downstream of the air heater 20. Damper drive 74 actuates damper 78 disposed in tempering air duct 44 which is a bypass duct provided for bypassing a portion of the ambient temperature primary air around the air preheater. By selectively opening and closing damper 76 and 78 relative to each other, controller 80 maintains the temperature of the primary fuel and primary air mixture leaving the mill 36 at a level of about 85 C.

Controllers 70 and 80 cooperate with each other by means of feedback signals so that the dampers 76 and 78 may be selectively opened or closed to maintain both the volume flow rate of the primary air to the mill at a preselected value dependent upon a fuel feed rate and also simultaneously to maintain temperature of the primary air mixture entering the mill at a level sufficient to insure that the temperature mixture leaving the mill is at about 85 C. But as the moisture content of solid fuels commercially available for use in combustion systems, such as steam generators, varies widely from a low of a few percent to as much as 50% or more, the degree of preheat, that is the primary air temperature required, to dry the pulverized fuel and maintain the proper mill outlet temperature can range from 200 to over 400 C. By selectively positioning dampers 76 and 78, the primary air can be separated into a first portion which is preheated by being passed in heat exchange relationship with the flue gas leaving the furnace through the air heater 20 and a second portion which is not preheated but bypasses the air preheater 20 through the tempering air duct 44 to remix at ambient temperature with the preheated primary air passing through duct 40 at a location downstream of the damper 76 prior to entering the mill 36.

When firing a fuel with a moisture content that is less than the moisture content of the design fuel, damper 78 can be selectively positioned so that the temperature of the primary air leaving air preheater 20 may be tempered, that is lowered, with ambient temperature air to control mill outlet temperature and prevent the excessive liberation of volatiles in the mill 36 which would occur if the primary air temperature were too high. However, when firing a fuel in the furnace that has a moisture content significantly higher than that of the design fuel, it is most frequently necessary to close damper 78 in the tempering air duct 44 to minimize the flow of tempering air therethrough so that the temperature of the preheated primary air leaving the air heater 20 will not be lowered. Nevertheless, as mentioned previously, even with the damper 78 closed leakage occurs through the tempering air duct 44 interconnecting the primary air supply duct 46 with the preheated primary air duct 44 so that some lowering of the temperature of the preheated primary air leaving the air heater 20 will necessarily occur.

In accordance with the present invention, this lowering of the temperature of the primary air leaving the air heater 20 by the leakage of ambient air through the tempering air duct 44 is minimized by disposing heat exchanger 60 in the tempering air duct 44 and passing a flow of heating fluid 62 through the heat exchanger 60 in heat exchange relationship with any tempering air leaking through duct 44 whenever the mill outlet temperature drops below the desired minimum level.

As discussed previously, temperature controller 80 would in response to signal 93 indicative of the mill outlet gas temperature, generate and transmit control signals to damper drives 72 and 74 to selectively open and close damper 76 and 78 in order to maintain mill outlet temperature at about 85 C. When controller 80 senses that the mill outlet temperature can no longer be maintained at about 85 C., that is when damper 78 has been closed so as to minimize the flow of tempering air through duct 44 but the temperature of the primary air still remains insufficient to maintain mill outlet temperature, controller 80 generates and transmits a third control signal 85 to flow control valve 64 operatively associated with the heat exchanger 60. In response to the signal 85 from the temperature controller 80, flow control valve 64 would open to permit the flow of a heating fluid through the heat exchanger 60 to preheat the tempering air leaking through duct 44 so as to raise the temperature of the tempering air from ambient temperature to a temperature in the range of 150 to 200 C. in order to lessen the effect of the tempering air upon the temperature of the preheated primary air leaving the air heater 20.

In the preferred embodiment illustrated in FIG. 1, the heating fluid 62 comprises hot water diverted from the waterwall cooling circuit of the furnace 10. Preferably, hot water is circulated from the lower waterwall inlet ring header 22 through heat exchanger 60 and returned to the waterwall cooling circuit upstream of the pump 26. In this manner, the boiler circulating pump 26 also provides the force for conveying the hot water through the heat exchanger 60 and no additional pump is required. For a typical 2400 pound pressure steam generator, the hot water taken from the lower waterwall ring header 22 will have the temperature of approximately 320 C. Therefore, this hot water will have plenty of capacity to heat the ambient air leaking through the tempering air duct 44.

For example, consider a steam generator operating on a high-moisture coal wherein 2,500,000 pounds of primary air is preheated to 350 C. with the tempering air damper 78 fully closed. Assuming a 10% leakage, that is a leakage of 250,000 pounds of primary air through the tempering duct 44 at an ambient temperature of 0 C., the temperature of the air entering the mill 36 would be reduced from 350 C. to 318 C. due to the leakage of cold tempering air into the preheated primary airstream. In accordance with applicant's invention, hot water at a temperature of about 350 C. would be circulated from the lower waterwall inlet ring header through heat exchanger 60 to preheat the 250,000 pounds of ambient air leaking through the tempering air duct 44 to a temperature of 200 C. This would result in the temperature of the air entering the mill 36 being raised back up to 336 C. which would result in a corresponding increase in the mill outlet temperature thereby permitting continued operation of the mill on the high moisture coal.

While the preferred embodiment has been shown and described in relation to a pulverized fuel-fired steam generator, the present invention may apply to any of a number of combustion systems wherein pulverized fuel is burned and various modifications may be made thereto by those skilled in the art without departing from the spirit and scope of the invention. Accordingly, it is to be understood that the invention has been described by way of illustration and is to be limited only in accordance with the claims appended hereto.

We claim:

1. In a combustion system for burning a moisture containing pulverized fuel having a mill wherein the fuel to be burned is pulverized and dried, a furnace formed of a plurality of water-cooled tube walls disposed between an inlet and an outlet header and defining a chamber wherein the dried pulverized fuel is burned thereby generating hot flue gas, cooling circuit means including circulating pump means interconnecting the inlet and outlet headers for circulating cooling water through the tubes forming said tube walls, burner means associated with said furnace for receiving the pulverized fuel entrained in primary air from the mill, an air heater for passing said primary air in heat exchange relationship with said hot flue gas thereby preheating said primary air, first duct means for supplying ambient primary air to said air heater, second duct means for conveying said preheated primary air from said air heater to the mill, and third duct means having flow damper means disposed therein interconnecting said first duct with said second duct for conveying ambient tempering air around said air heater and remixing the tempering air with said preheated primary air; a method of operating said combustion system comprising:

(a) measuring the temperature of the mixture of pulverized fuel and primary air leaving the mill;

(b) closing the flow damper means disposed in said third duct means whenever the measured mixture temperature drops below a preselected minimum thereby reducing the flow of tempering air therethrough to a leakage flow leaking past the closed flow damper means; and (c) circulating water from the water-cooled tube walls inlet header in heat exchange relationship with the tempering air leakage flow leaking past the closed flow damper means in said third duct means thereby preheating the tempering air leakage flow and thence returning the water to the water-cooled tube walls cooling circuit at a location upstream of the circulating pump means.

* * * * *